J. G. FOX.
Nut-Lock.

No. 219,812.  Patented Sept. 23, 1879.

Witnesses:
Robert L. Fenwick
J. P. Th. Lang

Inventor:
Jacob G. Fox
by
Mason, Fenwick & Lawrence
Attorneys.

UNITED STATES PATENT OFFICE.

JACOB G. FOX, OF OTSEGO LAKE, MICHIGAN.

IMPROVEMENT IN NUT-LOCKS.

Specification forming part of Letters Patent No. 219,812, dated September 23, 1879; application filed July 19, 1879.

*To all whom it may concern:*

Be it known that I, JACOB G. FOX, of Otsego Lake, Otsego county, and State of Michigan, have invented a new and Improved Combined Nut-Lock and Washer; and I do hereby declare that the following is a full, clear, and exact description of the same, reference being had to the accompanying drawings, forming a part of this specification, in which—

Figure 1:
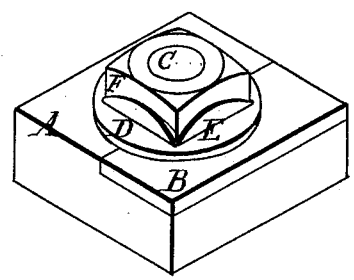
Figure 2:
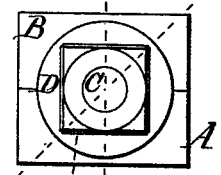
Figure 3:
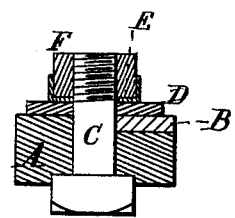
Figure 4:
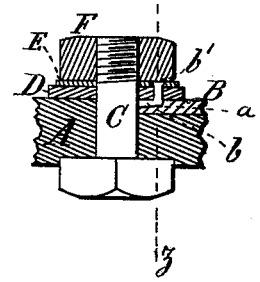
Figure 5:
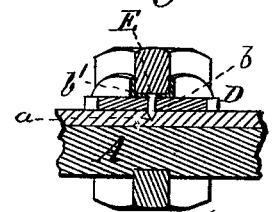
Figure 6:
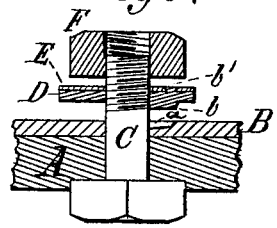

Figure 1 is a perspective view, showing a combined nut-lock and washer made in accordance with my invention and applied to a bolt and bearing-piece. Fig. 2 is an end view of the parts shown in Fig. 1. Fig. 3 is a diagonal longitudinal section on the line $x\ x$ of Fig. 2. Fig. 4 is also a longitudinal section in the line $y\ y$ of Fig. 2. Fig. 5 is a longitudinal section in the line $z\ z$ of Fig. 4. Fig. 6 is a longitudinal section of the parts as they appear before being fully brought together and screwed up tight.

My invention consists of an improved article of manufacture—to wit, a nut and bolt fastening composed of two complete washers, one flexible and the other stiff, the flexible one corresponding in size to the diagonal diameter of the nut and made to rest upon the flat surface of the other, and each having a central bolt-hole through it, and both united by a single rivet, and one provided with a single stop-pin, as will be hereinafter fully described.

By my invention two ordinary-shaped washers of relatively light and heavy construction can be used upon a bolt and behind a nut, in the ordinary manner, for the purpose of fastening such bolt and nut from turning, by simply uniting the two washers together with a rivet on one side of its center, and providing a single stop-pin on the bottom of the other washer and a cavity in the bearing-plate for the reception of the stop-pin, and adapting the lighter washer, by making it of ductile or flexible metal, for being turned up against the nut on all sides.

A washer with a single stop-pin can be more readily fitted to the cavity of the bearing-plate than can a washer with two stop-pins, as the difficulty of providing for the registering of the two stop-pins with the two cavities is avoided; and a locking-washer which is round and without a depression on its surface other than the bolt-hole through it can be more cheaply manufactured than a segmental or cross-shaped or partial washer which is to be let down into a rabbet of another or sustaining washer; and a sustaining-washer of wrought metal which is made without a depression on its top can also be manufactured more readily and much cheaper than washers with such rabbets; and, further, soft-metal washers which present a full bearing-surface to the nut offer greater resistance under the compression of the nut and screw, and at the same time afford four turned-up projections as stops to the nut; and, finally, the metal binding the hole in the washer bears against the bolt all round, and thus the uniting-rivet is relieved of undue strain.

In the accompanying drawings, A may represent a railroad-rail, and B a fish-plate applied to the same, or these parts may represent any other two objects required to be bolted together. The fish-plate B is shown in the drawings, except in Fig. 6, as being on only one side of the bolt, whereas in practice it will be extended (see Fig. 6) on the other side of the bolt to the same extent as is shown on the one side. The rail A is provided with a many-sided recess for the square or other many-sided head of a bolt, C, to set in, and be kept from turning by the flat sides of the recess. In the fish-plate a V-shaped nick or depression, $a$, is formed by a cold-chisel, for a purpose presently described.

D is a strong rigid washer of steel or iron, formed with a spur, $b$, on its inner face, corresponding to the nick $a$ in the rail, and adapted to fit snugly therein, while the washer is free to come in close contact with the neck of the rail. This washer is also formed with a projecting rivet, $b'$, on its outer face, and upon this rivet a thin flexible washer, E, of brass or other ductile metal, is fitted and riveted, as shown in Fig. 6 of the drawings. The washers D and E are of corresponding size, and, preferably, round. F is the many-sided nut of the bolt C.

The parts described are placed upon the bolt, and by screwing up the nut the two washers are made to bind upon each other, and the spur $b$ is forced firmly into the nick $a$, and by this means the rigid washer is kept from turning. This accomplished, the thin washer E is turned up on four sides against the sides of the nut, as shown in Fig. 3 of the drawings, and the nut thereby prevented from turning, and thus the bolt, by the square shoulders of the recess in which its head fits being prevented also from turning, there is very little possibility of the nut ever turning back unless it is released by re-turning down the sides of the thin washer.

In some cases of use of this combined nut-lock and washer there will be no necessity for a nick in the surface against which the rigid washer bears, for if this surface is of wood the V-shaped spur $b$ will, by the power of the nut while it is being screwed home upon the bolt C, become embedded in the wood, and thus locked firm enough to prevent the washer D from turning when back-strain from jars or other causes comes upon the nut.

I have provided but a single spur and rivet, as this plan avoids the inconvenience of first marking the place and then cutting the nicks experienced in those plans of construction where two or more spurs are used. When only one spur is used no difficulty is experienced in fitting it into its nick, which is not the case with two spurs in the event of the nicks not being just opposite each other and in line with the spurs; and when the washer is just equal in diameter to the diagonal diameter of the nut the washer can be turned up on all sides of the nut, and will present no serious obstruction to the nut and washer being wiped or cleaned off.

What I claim is—

The improved new article of manufacture, consisting of the nut and bolt fastening composed of the two complete washers, one light and the other stout, and both united by a rivet, and one provided with a stop-projection, as and for the purpose herein described.

JACOB G. FOX.

In presence of—
  N. R. GILBERT,
  C. S. BRINK.